(12) United States Patent
Kobayashi et al.

(10) Patent No.: US 7,900,955 B2
(45) Date of Patent: Mar. 8, 2011

(54) AIRBAG DEVICE

(75) Inventors: Yuki Kobayashi, Saitama (JP); Satoshi Iijima, Saitama (JP); Takuhei Kusano, Saitama (JP); Kazuhiro Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 12/361,038

(22) Filed: Jan. 28, 2009

(65) Prior Publication Data

US 2009/0194980 A1 Aug. 6, 2009

(30) Foreign Application Priority Data

Jan. 31, 2008 (JP) ................................. 2008-021052

(51) Int. Cl.
*B60R 21/215* (2006.01)
(52) U.S. Cl. ................. 280/728.2; 280/728.3; 280/730.1
(58) Field of Classification Search ............... 280/728.1, 280/728.2, 728.3, 730.1
See application file for complete search history.

(56) References Cited

U.S. PATENT DOCUMENTS

| | | | | |
|---|---|---|---|---|
| 4,773,673 A | * | 9/1988 | Sakurai ..................... | 280/728.3 |
| 4,852,907 A | * | 8/1989 | Shiraki et al. ............... | 280/731 |
| 5,035,444 A | * | 7/1991 | Carter ........................ | 280/732 |
| 5,066,037 A | * | 11/1991 | Castrigno et al. ........... | 280/732 |
| 5,709,402 A | * | 1/1998 | Leonard ..................... | 280/728.2 |
| 5,735,542 A | * | 4/1998 | Bohn .......................... | 280/728.2 |
| 5,941,558 A | * | 8/1999 | Labrie et al. ............... | 280/728.3 |
| 5,967,545 A | * | 10/1999 | Iijima et al. ................ | 280/730.1 |
| 6,007,090 A | * | 12/1999 | Hosono et al. ............. | 280/730.2 |
| 6,076,851 A | * | 6/2000 | Davis et al. ................ | 280/728.2 |
| 6,113,131 A | * | 9/2000 | Uehara et al. .............. | 280/728.3 |
| 6,158,763 A | * | 12/2000 | Dominique et al. ........ | 280/728.2 |
| 6,502,851 B2 | * | 1/2003 | Kitagawa .................... | 280/728.2 |
| 6,601,870 B2 | * | 8/2003 | Suzuki et al. ............... | 280/728.3 |
| 6,846,009 B2 | * | 1/2005 | Kuroe et al. ................ | 280/730.1 |
| 6,848,709 B2 | * | 2/2005 | Nagatsuyu .................. | 280/730.1 |
| 6,929,280 B2 | * | 8/2005 | Yasuda et al. .............. | 280/728.2 |
| 7,422,232 B2 | * | 9/2008 | Cowelchuk et al. ........ | 280/728.3 |
| 7,497,464 B2 | | 3/2009 | Horiuchi et al. | |
| 7,578,516 B2 | * | 8/2009 | Horiuchi et al. ............ | 280/728.3 |
| 2009/0167002 A1 | * | 7/2009 | Suzuki et al. ............... | 280/728.2 |
| 2009/0206583 A1 | * | 8/2009 | Misaki et al. ............... | 280/730.1 |
| 2009/0206628 A1 | * | 8/2009 | Misaki et al. ............... | 296/78.1 |

FOREIGN PATENT DOCUMENTS

| | | |
|---|---|---|
| DE | 10 2007 007 338 A1 | 8/2007 |
| EP | 0 769 426 A2 | 4/1997 |
| EP | 0 822 125 A1 | 2/1998 |
| EP | 1762440 A1 | 3/2007 |
| JP | 2007-69792 A | 3/2007 |

* cited by examiner

*Primary Examiner* — Paul N Dickson
*Assistant Examiner* — Laura Freedman
(74) *Attorney, Agent, or Firm* — Birch, Stewart, Kolasch & Birch, LLP (57) ABSTRACT

To provide an airbag device for improving integrity between the airbag and exterior parts of a vehicle body and which excels in applicability. An airbag device is provided with a case which accommodates an airbag and an inflator. A lid is provided for releasing a side of the case when the airbag deploys together with a lid cover for covering the lid.

18 Claims, 6 Drawing Sheets

AIRBAG DEVICE

CROSS-REFERENCE TO RELATED APPLICATIONS

The present application claims priority under 35 USC 119 to Japanese Patent Application No. 2008-021052 filed on Jan. 31, 2008 the entire contents of which are hereby incorporated by reference.

BACKGROUND OF THE INVENTION

1. Field of the Invention

The present invention relates to an airbag device for a vehicle such as a motorcycle or four-wheeled vehicle.

2. Description of Background Art

There has been a motorcycle equipped with an airbag device. The airbag device includes an inflator, an airbag, and a module cover. The inflator and the airbag are accommodated in a casing provided on the vehicle body. The module cover openably covers a top opening of the casing, thereby hiding the inflator and the airbag. The module cover includes a tear line. When the airbag is deployed, the module cover is torn along the tear line to be forwardly opened by being pushed by the deploying airbag, thereby allowing the airbag to be deployed further. See, for example, JP-A No. 2007-69792.

In the above technique, however, the module cover makes up a vehicle body exterior, so that there can be cases where it is difficult to secure an exterior design integrity between the module cover and other exterior parts of the vehicle body. Furthermore, to allow the module cover to make up a vehicle body exterior while being capable of appropriate opening movement, it is necessary to design the module cover differently for different models of motorcycles. This reduces the applicability of the airbag device.

SUMMARY AND OBJECTS OF THE INVENTION

An object of the present invention is to provide an airbag device which, while excelling in applicability, can improve exterior design integrity between the airbag device and a vehicle body exterior.

According to an embodiment of the present invention, an airbag device is provided that includes a case 53 which accommodates an airbag 51 and an inflator 52 with a lid 62 which, when the airbag deploys, releases a side of the case. A lid cover 70 is provided for covering the lid.

Designing a lid cover which is to make up an exposed exterior part of a vehicle body requires consideration to be made to prevent sink lines from being formed on the lid cover and also to secure integrity, in terms of both material and exterior design, between the lid cover and other exterior parts of the vehicle body. The lid cover structured as in the above embodiment of the present invention, however, requires no such consideration to be made, so that the lid cover is only required to be capable of being released when the airbag is deployed.

According to an embodiment of the present invention, the lid cover makes up an exterior design of a vehicle.

It is, therefore, possible to form the lid cover using a material similar to that of other exterior parts of the vehicle body separately from the lid closely related with the deploying function of the airbag.

According to an embodiment of the present invention, the lid cover is structured to be easily released from a peripheral part (for example, the fixing seat 77 of the following embodiment) when the airbag deploys.

Therefore, the lid cover does not hinder the opening movement of the lid.

According to an embodiment of the present invention, the lid cover is provided with a fixture part for fixation to a peripheral part, the fixture part includes a fragile portion.

It is, therefore, possible, by adjusting the fragile portion, to adjust the way the lid cover opens when the lid is opened by the deploying airbag.

According to an embodiment of the present invention, the lid cover is forwardly openable along a forward direction of the vehicle. This allows the airbag to be deployed effectively.

According to an embodiment of the present invention, an exterior surface of the lid cover makes up a panel section 32a or top shell 32 are positioned rearward of a handlebar 43 and forward of a seat 27 of a motorcycle.

In this arrangement, the lid cover does not spoil the appearance of the conspicuous exterior portion of the motorcycle.

According to an embodiment of the present invention, the lid cover itself can be formed of an exterior member of the vehicle body. Therefore, unlike in cases where a lid is exposed on the vehicle body, the lid cover can be designed without giving consideration for the prevention of sink line generation or for securing integration, in terms of both material and exterior design, between the lid cover and other exterior parts of the vehicle. Namely, the lid cover is only required to be capable of being released when the airbag is deployed. Thus, integrity between the lid cover and other exterior parts of the vehicle can be easily secured without special consideration. Furthermore, the case and the lid can be commonly used for different models of motorcycles, enhancing the applicability of the airbag device.

According to an embodiment of the present invention, the lid cover can be formed of a material similar to that of other exterior parts of the vehicle body separately from the lid closely related with the deploying function of the airbag. This facilitates improving the external appearance quality of the motorcycle.

According to an embodiment of the present invention, the lid cover does not hinder the opening movement of the lid, so that the airbag can be deployed smoothly.

According to an embodiment of the present invention, it is possible, by adjusting the fragile portion, to adjust the way the lid cover opens when the lid is opened. That is, the fragile portion can be adjusted to allow the lid cover to open without fail.

According to an embodiment of the present invention, the airbag can hold the occupant.

According to an embodiment of the present invention, the lid cover does not spoil the appearance of the conspicuous exterior portion of the motorcycle, and allows the external appearance quality of the motorcycle to be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to drawings. The directions front, rear, left, and right referred to in the following description are as seen in the forward direction of the motorcycle unless otherwise specified. In the attached drawings, arrows FR, LH, and UP represent the forward, leftward, and upward directions, respectively, of the vehicle.

Figure 1:
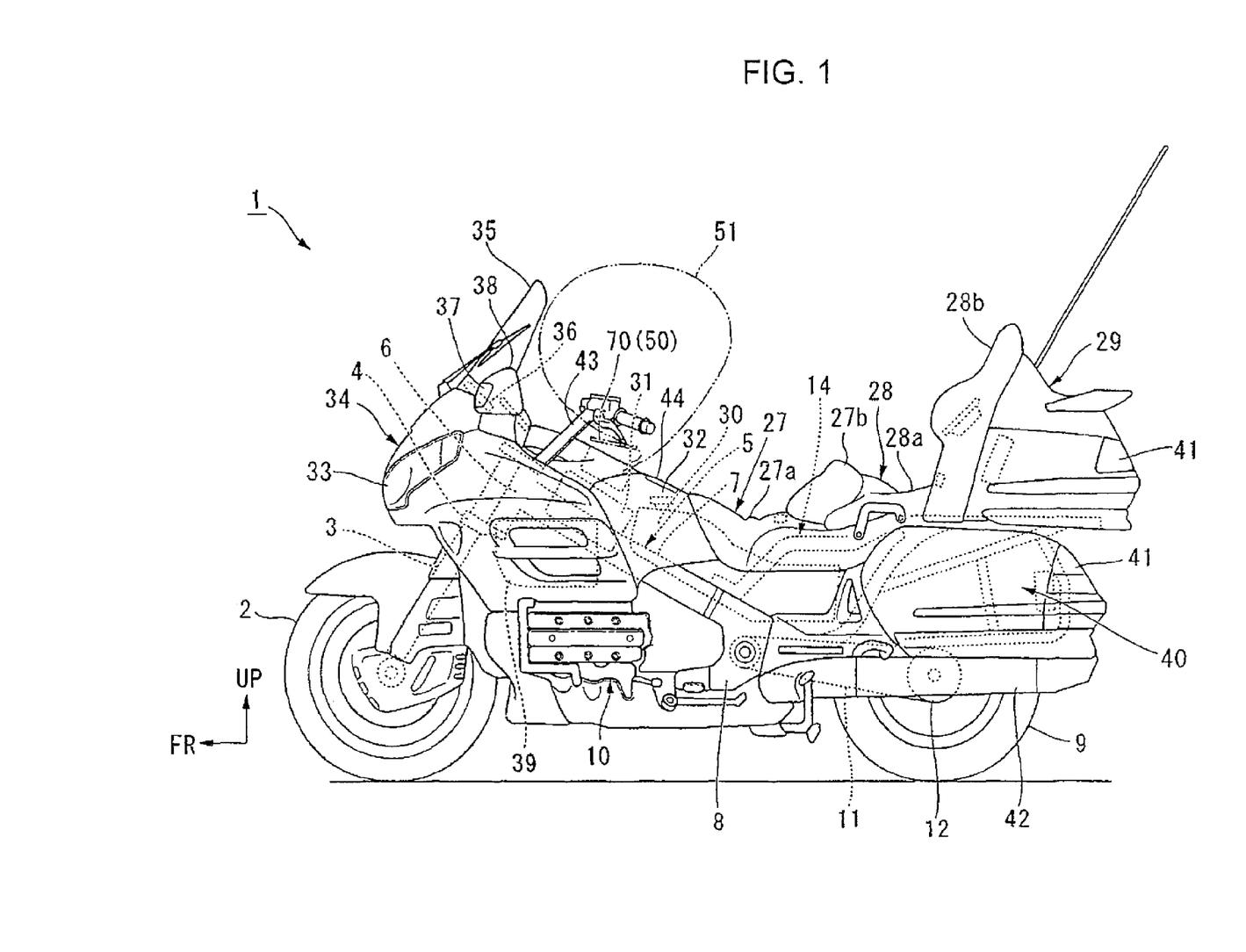
FIG. 1 is a side view of a motorcycle according to an embodiment of the invention.
Figure 2:
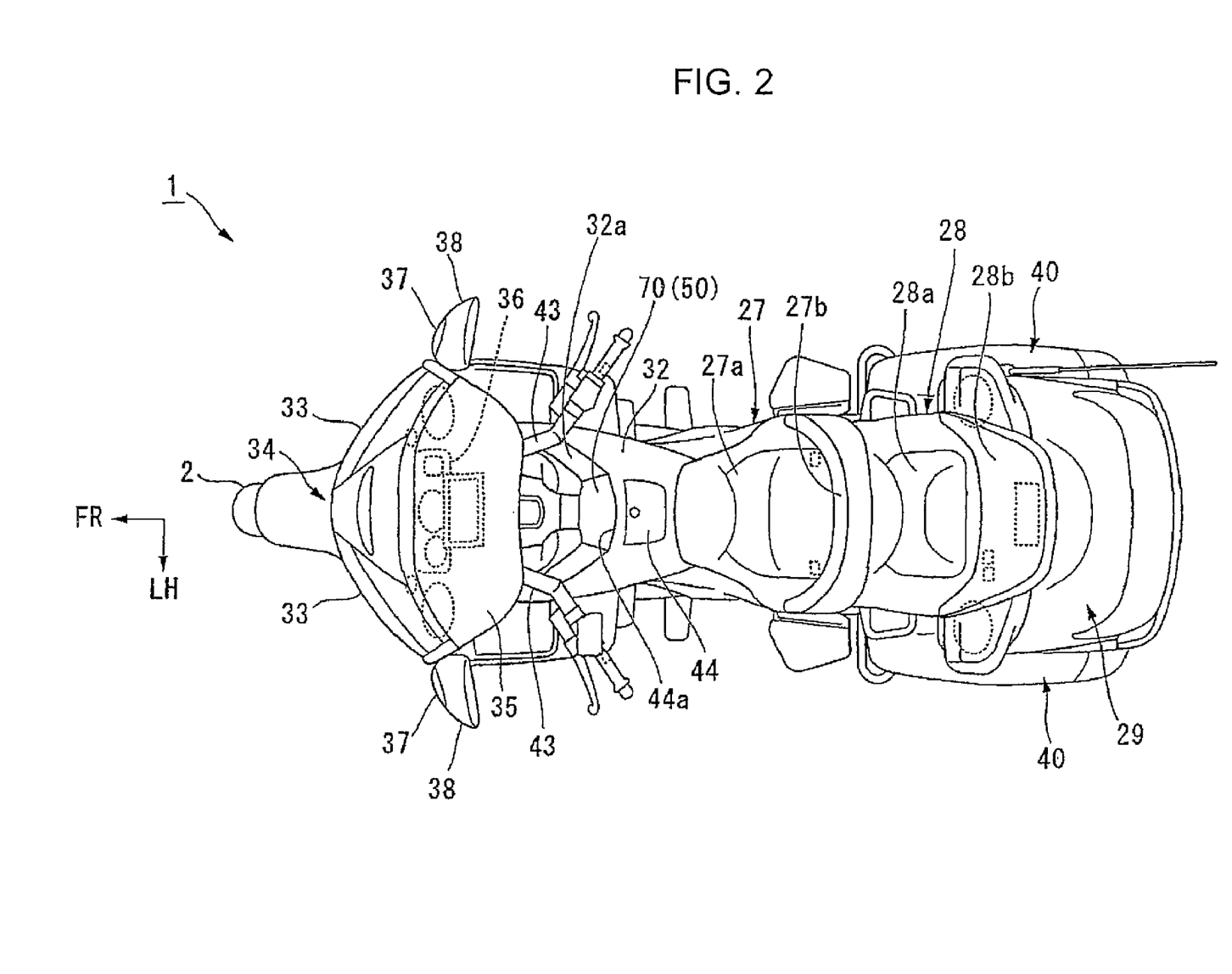
FIG. 2 is a plan view of the motorcycle according to the embodiment of the invention.
Figure 3:
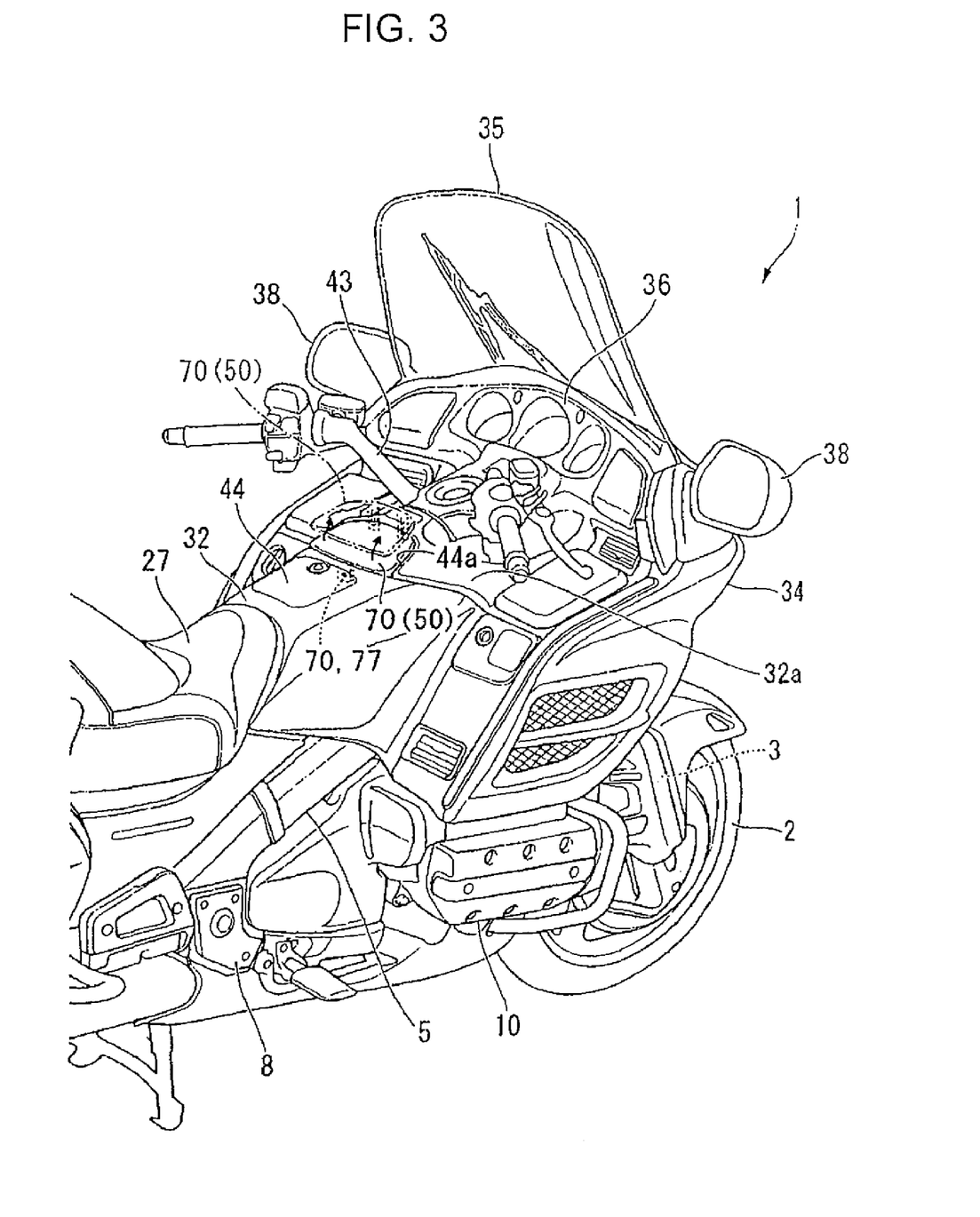
FIG. 3 is a perspective view of a front portion of the motorcycle according to the embodiment of the invention.

As shown in FIGS. 1 to 3, a front wheel 2 of a motorcycle 1 is journaled to a lower end portion of a pair of left and right front forks 3. An upper portion of each of the front forks 3 is steerably connected, via a steering system 4, to a head pipe 6 provided in a front end portion of a body frame 5. A handlebar 43 for steering the front wheel is attached to an upper portion of the steering system 4. A pair of left and right main frames 7 extend downwardly and rearwardly from the head pipe 6. A water-cooled, 4-stroke, horizontally-opposed six-cylinder engine 10 as a prime mover for the motorcycle 1 is mounted below the main frames 7.

A front end portion of a swing arm 11 to which a rear wheel 9 is journaled is swingably connected to a pivot plate 8 connected to a rear end portion of each of the main frames 7. The swing arm 11 is of a hollow one-sided type, and the rear wheel 9 is journaled to a rear end portion thereof. A drive shaft, not shown, extending from the engine 10 is inserted through the one-sided swing arm. Power generated by the engine 10 is transmitted to the rear wheel 9 via the drive shaft and a gear box 12 disposed in a central portion of the rear wheel.

A front portion of a seat frame 14 supporting front and rear seats 27 and 28 for occupants is joined to near the pivot plate 8. The front seat 27 is for a rider. The rear seat 28 is for a pillion passenger. The front seat 27 includes a front seat body 27a and a backrest 27b. The rear seat 28 includes a rear seat body 28a and a seat back 28b. The front and rear seat bodies 27a and 28a are integrally formed, and the backrest 27b is disposed between them. A rear trunk 29 is disposed behind the rear seat body 28a. The seat back 28b is positioned in front of the rear trunk 29. A fuel tank 30 and an air cleaner box 31 for cleaning intake air are disposed forwardly of the front seat 27 with the fuel tank 30 extending to below the front seat 27. These parts are covered by a top shelter 32 which is an exterior part.

A large front cowl 34 provided with a pair of left and right headlamps 33 is disposed in a front body portion of the motorcycle 1. A large windscreen 35 is provided above a front portion of the front cowl 34. A meter panel 36 provided with, for example, a speedometer and a tachometer is disposed on a rear side of an upper portion of the front cowl 34. The top shelter 32 extending downwardly and rearwardly from the meter panel 36 covers a motorcycle body portion ranging from the rear side of the front cowl 34 to the front seat 27. Left and right mirrors 38 each provided with a front winker 37 are attached to both sides of an upper portion of the front cowl 34. A radiator 39 for the engine is disposed laterally inwardly of the front cowl 34 (inwardly in the vehicle width direction), the radiator 39 being oriented approximately perpendicularly to the lateral direction of the motorcycle.

Left and right saddle bags 40 are disposed on both sides below the rear seat 28 and rear trunk 29. Rear combination lamps 41 each of which functions as tail lamps, brake lamps, and rear winkers are disposed on both sides of a rear portion of the left and right saddle bags 40 and both sides of a rear portion of the rear trunk 29. A muffler 42 for engine exhaust is disposed downwardly of each of the left and right saddle bags 40.

The top shelter 32 is provided with an openable/closable shelter lid 44 disposed in front of the front seat 27. The shelter lid 44 allows fuel to be fed to the internal fuel tank through a filler opening of the fuel tank. A panel section 32a is formed in front of the shelter lid 44 to be rearward of a handlebar 43 and forward of the front seat 27. The panel section 32a has a cut-out portion 44a in which an airbag device 50 is disposed. Alternatively, the top shelter 32 may be provided with a depressed part, and the airbag device 50 may be disposed in the depressed part, or such a depressed part to accommodate the airbag device 50 may be provided in the panel section 32a.

Figure 4:
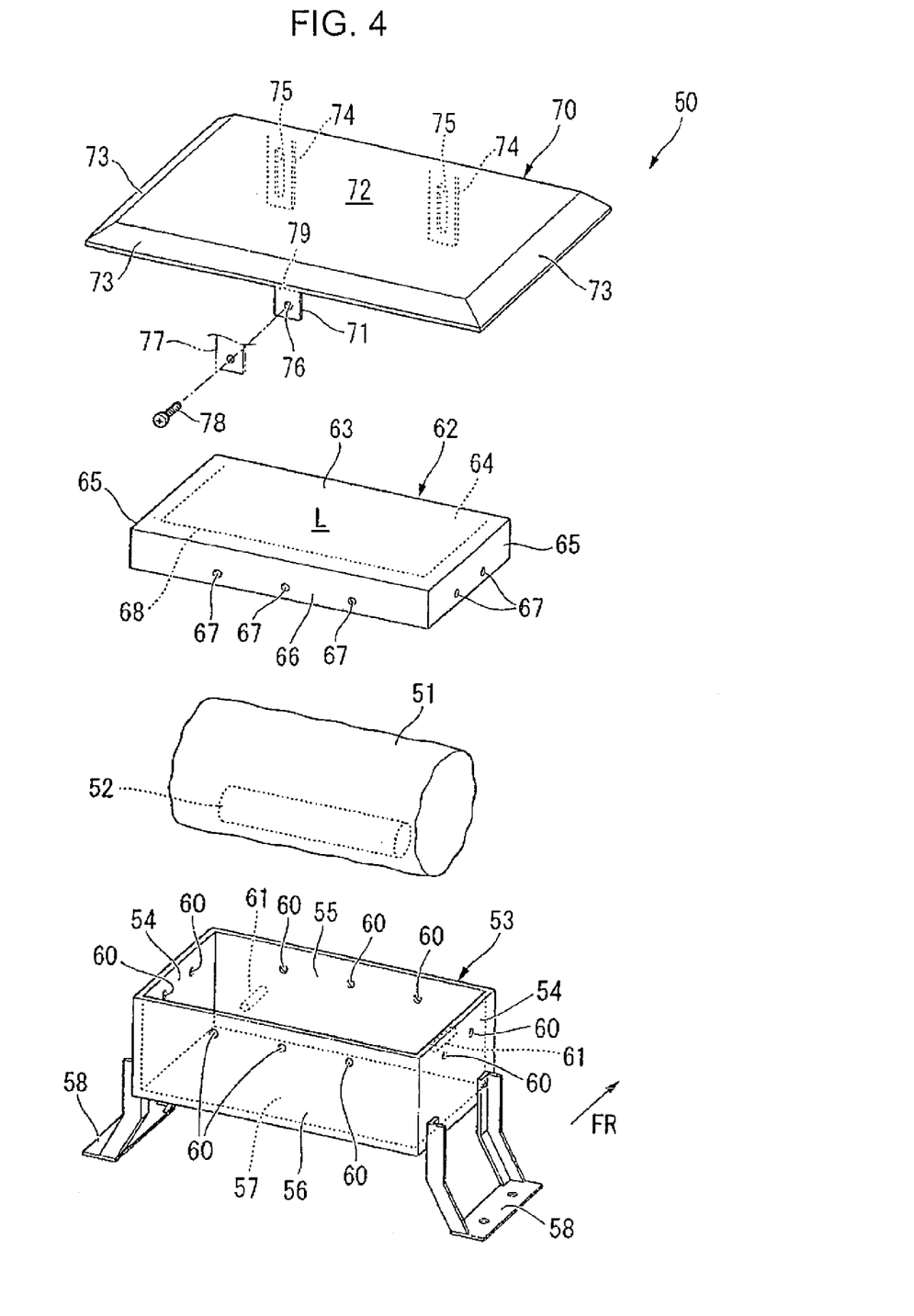
FIG. 4 is an exploded perspective view of an airbag device according to the embodiment of the invention.
Figure 5:
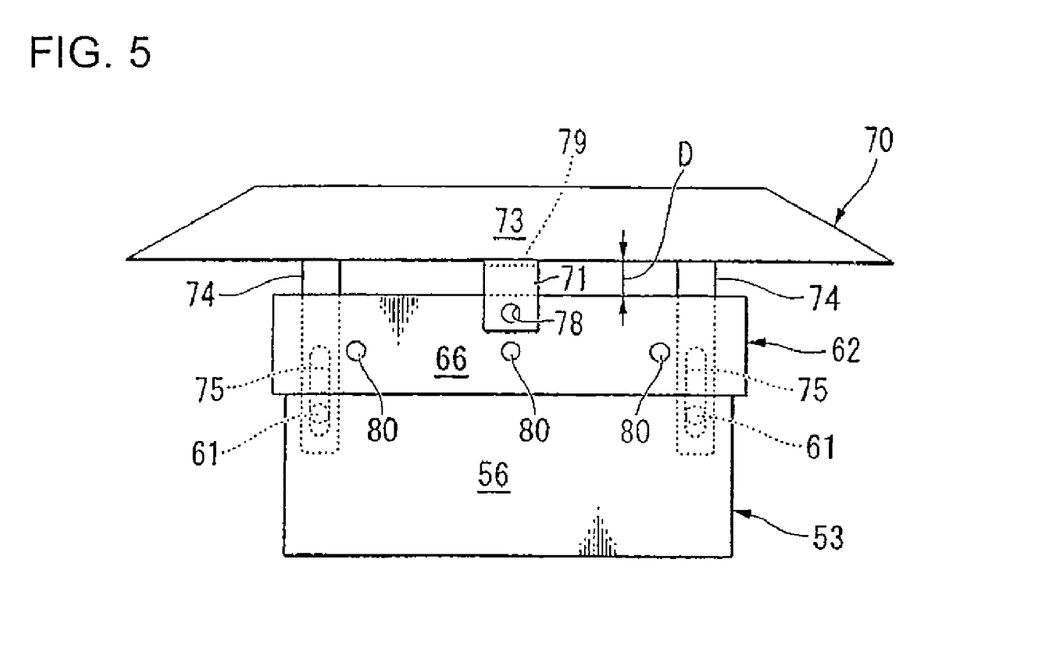
FIG. 5 is a schematic front view of the airbag device according to the embodiment of the invention.
Figure 6:
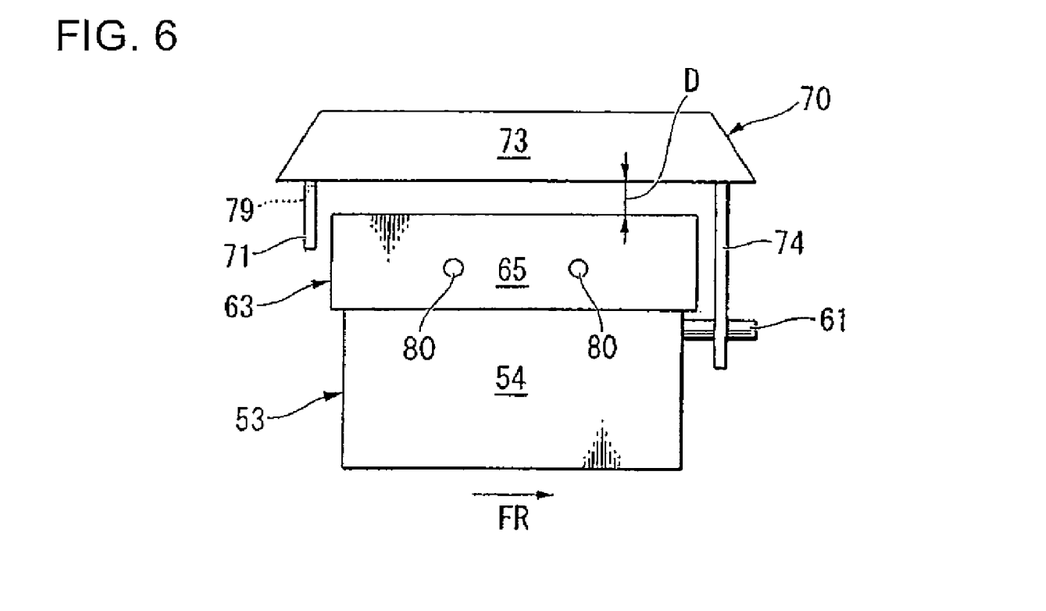
FIG. 6 is a schematic right side view of the airbag device according to the embodiment of the invention.
Figure 7:
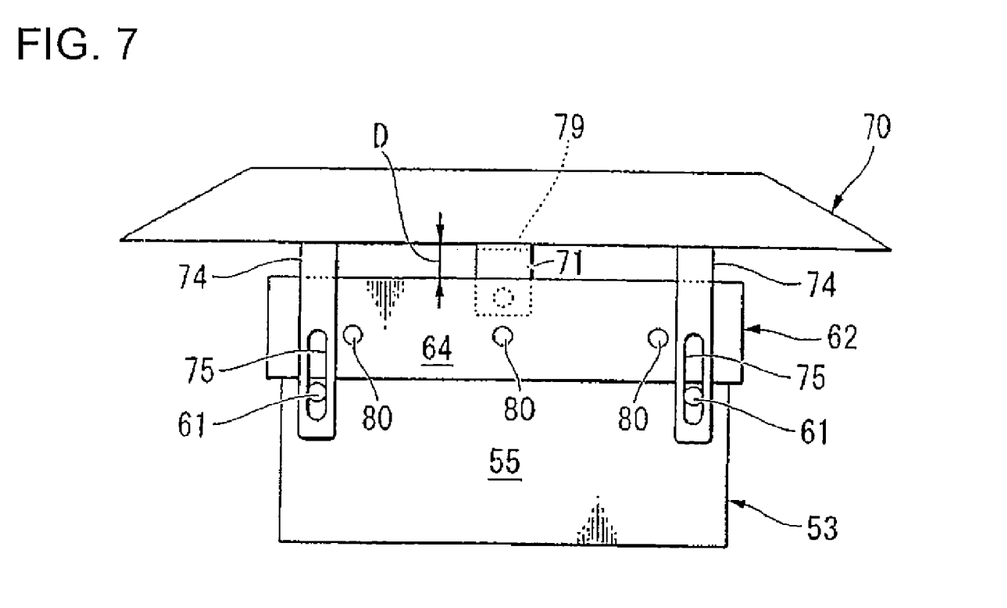
FIG. 7 is a schematic rear view of the airbag device according to the embodiment of the invention.

FIG. 4 is an exploded perspective view of the airbag device. FIGS. 5 to 8 each show the airbag device schematically. As shown in FIGS. 4 to 8, the airbag device 50 has a case 53 which accommodates an airbag 51 and an inflator 52. The case 53 is shaped like a rectangular box having an open top, left and right sidewalls 54, front wall 55, rear wall 56, and bottom wall 57. A bracket 58 to be fixed to the body frame 5 is fixed to each of the sidewalls 54. The bracket 58 varies in type between different models of motorcycles.

Fixing holes 60 for rivets 80 are formed in an upper portion of each of the front wall 55, rear wall 56, and side walls 54. The number of the fixing holes 60 formed in each of the front wall 55 and rear wall 56 is, for example, three. The number of the fixing holes 60 formed in each of the side walls 54 is, for example, two. Two pins 61 are provided in a lower portion of the front wall 55.

The airbag 51 is made of, for example, nylon cloth. The inflator 52 is provided with an electric igniter, an ignition agent, and a nitrogen gas generating agent. The airbag 51 accommodated in the case 53 may be attached with one end of a belt member, not shown, the other end of which is attached to the vehicle body. In such an arrangement, when the airbag 51 is deployed, the belt member can keep the airbag 51 in an appropriate position.

Figure 8:
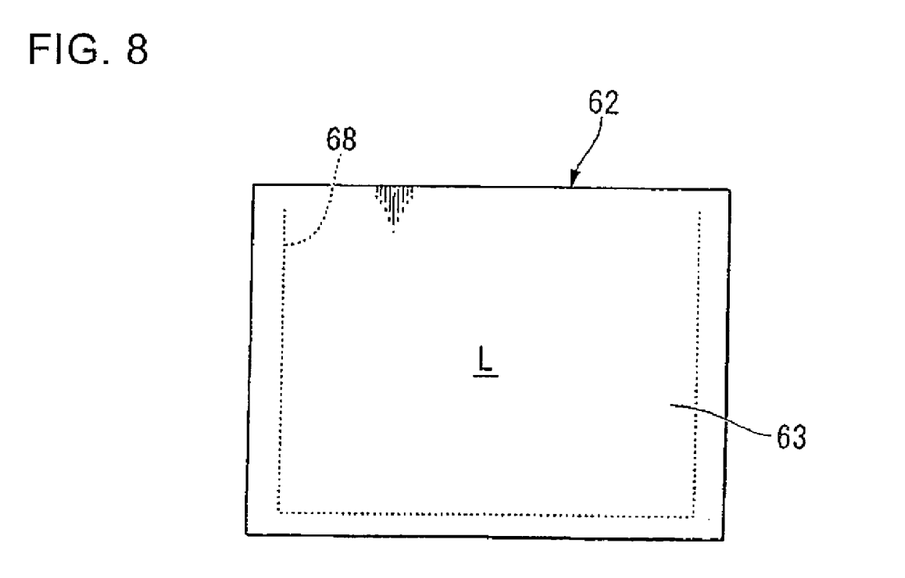
FIG. 8 is a plan view of a lid according to the embodiment of the invention.

The open top of the case 53 is fixedly covered by the lid 62 such that the lid 62 is released when the airbag 51 is deployed. The lid 62 is a rectangular member having an upper wall 63, a front wall 64, side walls 65, and a rear wall 66, the upper wall 63 being surrounded by the other walls. It has fixing holes 67 corresponding to the fixing holes 60 for the rivets 80 provided in the case 53, i.e. three each of the fixing holes 67 in the front wall 64 and rear wall 66, and two each in the side walls 65. The upper wall 63 of the lid 62 includes a U-shaped tear line 68 formed of three portions with one portion extending along the rear wall of the lid 62 and the rest of two portions extending along the two side walls of the lid 62. When the airbag 51 deploys, the U-shaped portion, i.e. an opening portion L, defined by the tear line 68 of the top wall 63 of the lid 62 is torn open along the tear line 68, allowing the airbag 51 to be deployed outward.

A lid cover 70 is, like the top shelter 32 and panel section 32a, a member to make up the exterior design of the motorcycle 1, so that it is formed of, for example, a material similar to that of the panel section 32a to look harmonious with the panel section 32a. The lid cover 70 has an upper wall 72 and a peripheral wall 73 surrounding the upper wall 72 and extending diagonally downwardly. The peripheral wall 73 is, in a front edge portion thereof, provided with a pair of downwardly extending guide bars 74. The guide bars 74 each have a guide slot 75. The pins 61 of the case 53 are inserted through the guide slots 75, so that, when the airbag 51 is deployed, the lid cover 70 is guided to move upwardly. A peripheral portion of the peripheral wall 73 of the lid cover 70 is designed to cover a peripheral portion of the cut-out portion 44a of the top shelter 32 so that the cut-out portion 44a is not visible from the outside.

The peripheral wall 73 of the lid cover 70 has, in a middle portion of its rear edge, a fixture piece 71 having a screw hole 76. The fixture piece 71 is fixed, with a screw 78, to a fixing seat 77 provided on the vehicle body. In this arrangement, when the lid cover 70 is set in place, a distance D is secured between the lid cover 70 and the lid 62. The distance D secures a space required to allow an initial opening movement of the opening portion L.

The fixture piece 71 includes a tear line 79 formed in a base portion thereof. When receiving a load from below in deployment of the airbag 51, the fixture piece 71 is broken off along the tear line 79 and separated from the peripheral wall 73.

When the fixture piece 71 is broken off the lid cover 70, the lid cover 70 is allowed to move up, relative to the case 53, being guided by the guide bars 74 and subsequently open forwardly (in the direction indicated by the arrows in FIG. 3) being led by its rear edge. As a result, the airbag 51 is allowed to inflate outward.

According to the above embodiment, when a frontal collision of the motorcycle 1 is detected, the inflator 52 is caused, by an ignition current from an airbag controller, not shown, to generate, for example, nitrogen gas. The nitrogen gas enters the airbag 51 to deploy it.

When, in an initial stage of inflation of the airbag 51, the lid 62 is pushed from below by the airbag 51 inflated in the case 53, the upper wall 63 of the lid 62 is torn along the tear line 68. This causes the opening portion L to forwardly open about a front portion thereof, allowing the airbag 51 to inflate outward.

As the airbag 51 further deploys causing the opening portion L of the lid 62 and the airbag 51 to push the lid cover 70 from the back side, the lid cover 70 is subjected to an upward force which eventually causes the fixture piece 71 of the lid cover 70 to be broken off along the tear line 79. As a result, the fixture piece 71 is left attached only to the fixing seat 77 provided on the vehicle body, and the lid cover 70 is moved upward causing the pins 61 to relatively move along the guide slots 75 of the guide bars 74. This causes the lid cover 70 to further open forwardly (in the direction indicated by the arrows in FIG. 3) about a front end portion thereof, allowing the airbag 51 to further deploy. The airbag 51 thus deployed can absorb the forward displacement of the occupant.

The lid cover 70 is only required to be capable of being released, when the airbag 51 deploys, by being pushed by the lid 62. Whereas the lid 62 including the tear line 68 is required to meet requirements in terms of its strength, rigidity, shape, and material so as to make the airbag 51 appropriately deployable, no such requirements are imposed on the lid cover 70. Therefore, the shape of the lid cover 70 can be designed, as an exterior part of the motorcycle 1, with higher flexibility; the lid cover 70 can be shaped not to cause the generation of sink lines; and the lid cover 70 can be formed of the same material as that of the panel section 32a. Thus, the lid cover 70 can be easily designed to be harmonious with the vehicle body design. The case 53, airbag 51, inflator 52, and lid 62 included in the airbag device 50 can be made common to different models of motorcycles. Therefore, to install the airbag device in different models of motorcycles, only the lid cover 70 and brackets 58 of the case 53 are required to be designed differently to suit different models of motorcycles. Thus, the airbag device has flexible applicability, being easily applicable to different models of motorcycles.

The lid cover 70 is, like the top shelter 32 and panel section 32a, a member to make up the exterior design of the motorcycle 1. Therefore, unlike the lid 62 that is closely related with the deploying function of the airbag 51, the lid cover 70 can be formed of a material similar to that of the panel section 32a so as to improve the external appearance quality of the motorcycle.

The lid cover 70 can be easily broken along the tear line 79, so that, when the airbag 51 is deployed, the lid cover 70 opens without fail not to hinder the deployment of the airbag 51.

The present invention is not limited to the above embodiment. For example, the fixture piece 71 of the lid cover 70 may be fixed to the rear wall 66 of the lid 62.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag device comprising:
a case for accommodating an airbag and an inflator;
a lid operatively positioned to close a top portion of the case, said lid including a section that can be opened when the airbag is deployed; and
a lid cover for covering the lid;
wherein the lid cover includes a fixture piece for normally securing the lid cover to the case, wherein when the inflator is actuated, the lid is moved upwardly from the case and the fixture piece is severed to permit an opening in the lid cover relative to the case to ensure the deployment of the air bag.

2. The airbag device according to claim 1, wherein the lid cover provides an exterior design of a vehicle.

3. The airbag device according to claim 2, wherein an exterior surface of the lid cover makes up a panel section positioned rearward of a handlebar and forward of a seat of a motorcycle.

4. The airbag device according to claim 1, wherein the lid cover is structured to be easily released from a peripheral part when the airbag deploys.

5. The airbag device according to claim 1, wherein the lid cover is provided with a fixture part for fixation to a peripheral part, the fixture part having a fragile portion.

6. The airbag device according to claim 1, wherein the lid cover is forwardly openable along a forward direction of a vehicle.

7. The airbag device according to claim 1, wherein the lid includes tear lines formed along a predetermined path for enabling the airbag to be deployed by severing the tear lines formed in the lid while permitting the lid to be retained relative to the case.

8. The airbag device according to claim 1, and further including pins securing a rear portion of case, said pins being movable within guide slots formed in guide bars secured to the lid cover to permit limited upward movement of the lid cover relative to the case when the air bag is deployed.

9. The airbag device according to claim 1, and further including fixing holes formed in the case and the lid for receiving securing means for securing the lid relative to the case.

10. An airbag device comprising:

a case including a closed bottom and upwardly projecting sidewalls with an open top portion, said case being adapted to accommodate an airbag and an inflator;

a lid operatively positioned to close the top portion of the case, said lid including a section that can be opened when the airbag is deployed; and a lid cover for temporarily covering the lid;

wherein the lid cover includes a fixture piece for normally securing the lid cover to the case, wherein when the inflator is actuated, the lid is moved upwardly from the case and the fixture piece is severed to permit an opening in the lid cover relative to the case to ensure the deployment of the air bag.

11. The airbag device according to claim 10, wherein the lid cover provides an exterior design of a vehicle.

12. The airbag device according to claim 11, wherein an exterior surface of the lid cover makes up a panel section positioned rearward of a handlebar and forward of a seat of a motorcycle.

13. The airbag device according to claim 10, wherein the lid cover is structured to be easily released from a peripheral part when the airbag is deployed.

14. The airbag device according to claim 10, wherein the lid cover is provided with a fixture part for fixation to a peripheral part, the fixture part having a fragile portion.

15. The airbag device according to claim 10, wherein the lid cover is forwardly openable along a forward direction of a vehicle.

16. The airbag device according to claim 10, wherein the lid includes tear lines formed along a predetermined path for enabling the airbag to be deployed by severing the tear lines formed in the lid while permitting the lid to be retained relative to the case.

17. The airbag device according to claim 10, and further including pins securing a rear portion of case, said pins being movable within guide slots formed in guide bars secured to the lid cover to permit limited upward movement of the lid cover relative to the case when the air bag is deployed.

18. The airbag device according to claim 10, and further including fixing holes formed in the case and the lid for receiving securing means for temporarily securing the lid relative to the case.

* * * * *